United States Patent [19]

Fleming et al.

[11] 4,454,593

[45] Jun. 12, 1984

[54] PICTORIAL INFORMATION PROCESSING TECHNIQUE

[75] Inventors: James R. Fleming, Indianapolis, Ind.; William A. Frezza, North Brunswick; Gerald S. Soloway, Holmdel, both of N.J.

[73] Assignee: Bell Telephone Laboratories, Incorporated, Murray Hill, N.J.

[21] Appl. No.: 265,069

[22] Filed: May 19, 1981

[51] Int. Cl.³ .................. G06F 3/14; G06F 15/20; G06K 15/20
[52] U.S. Cl. .................. 364/900; 340/703; 340/723; 340/750; 364/521
[58] Field of Search .............. 364/518, 521, 578, 200, 364/900; 340/703, 709, 720, 723, 724, 750; 358/10

[56] References Cited

U.S. PATENT DOCUMENTS

| Re. 30,785 | 10/1981 | Lovercheck et al. | 340/723 X |
|---|---|---|---|
| 3,646,571 | 2/1972 | Kurata | 364/300 |
| 3,973,245 | 8/1976 | Belser | 364/200 |
| 3,976,982 | 8/1976 | Eiselen | 364/900 |
| 4,145,754 | 3/1979 | Utzerath | 340/750 X |
| 4,146,877 | 3/1979 | Zimmer | 340/723 |
| 4,177,462 | 12/1979 | Chung | 340/723 X |
| 4,204,207 | 5/1980 | Bakula et al. | 340/723 |
| 4,262,302 | 4/1981 | Sexton | 358/10 |
| 4,301,514 | 11/1981 | Eifuku et al. | 364/900 |
| 4,303,986 | 12/1981 | Lans | 340/703 X |
| 4,342,029 | 7/1982 | Hofmanis et al. | 340/703 |

OTHER PUBLICATIONS

Brown et al.: Picture Description Instructions for the Telidon Videotex System, CRC Technical Note No. 699-E, Nov. 1979.

*Primary Examiner*—Felix D. Gruber
*Attorney, Agent, or Firm*—Barry H. Freedman

[57] ABSTRACT

A technique for processing pictorial information to enable its display on a desired display device independent of the latter's resolution characteristics includes a unique encoding procedure and a corresponding decoding and display procedure. Attributes of each element of a picture or image (such as its color) are specified by a group of N bits. The bits are assembled to form M-bit active portions of a series of bytes. M and N need not be integrally related. Ones of the words also define the size of the elements with respect to a unit display space (the horizontal and vertical dimensions of each element can be different), the order in which the elements are arranged in the picture (e.g., left to right or vice versa) and the value of N. The bytes are decoded and the picture displayed by locating each pel in the unit screen coordinate space, mapping each location to a corresponding storage location in an array formed by a frame memory, writing the attributes of each pel in one or more of the storage locations, and sequentially reading the contents of the memory and applying the output to the display device.

14 Claims, 10 Drawing Figures

PICTORIAL INFORMATION PROCESSING TECHNIQUE

BACKGROUND OF THE INVENTION

1. Field of the Invention

The present invention relates generally to the processing of pictorial information and, in particular, to a technique for encoding information describing a picture in a manner that permits its display on devices having different resolution characteristics.

2. Description of the Prior Art

Computer-based information systems have now evolved to the stage where it is both desirable and feasible to allow access to the wealth of information stored in private or public data bases to the public, using commonly available display devices and communicating via existing channels. "Viewdata" or "videotex" are generic terms which have been used to describe systems enabling two-way, interactive communication between the user and the data base, generally communicating via telephone lines and using an ordinary but specially adapted television set for display of pictorial information or text. "Teletext" is another generic term used to describe one-way communication from the data base to the user, with transmission being accomplished in portions of the broadcast T.V. spectrum and display again being on a specially adapted T.V. Both system types must have a large range of flexibility, since a number of alternatives exist with respect to various system components. For example, although a television set may be a preferred display device for home use, different terminals may access the data base in an office environment, such as bi-level (plasma) displays, and other special purpose CRTs. Additionally, other communication channels, such as dedicated coaxial, twisted pair cable, or satellite or land-based radio may interconnect the users who input or output information from the data base, and each type of channel has its own requirements and limitations.

In view of the fact that different types of equipment and facilities must interact to achieve satisfactory overall results, several attempts have been made to standardize the manner in which information (primarily pictorial as opposed to text) is encoded and decoded. The success of these systems, which include one described by the Communications Research Center of the Canadian Department of Communications, in CRC Technical Note No. 699-E published November 1979 in Ottawa, Canada, must be measured against several parameters. First, the procedure used to encode the pictorial information must make reasonably efficient use of the bandwidth available in the communication channel and the processing capability of the microprocessor usually located in the user's terminal. Second, the users of the system must, during both encoding and display operations, have a high degree of control and flexibility in specifying how the information will be processed. Finally, the techniques used must recognize that different equipment—particularly displays—will be used, some having nonstandard resolution and other capabilities, and that all must operate satisfactorily using the same encoding/decoding strategy.

While the Canadian and other systems have been somewhat successful in achieving the capabilities just described, it still remains that the efficiency, flexibility, interchangeability and universality of the technique can be improved.

SUMMARY OF THE INVENTION

In accordance with the present invention, pictorial information is processed using a unique encoding procedure and a corresponding decoding and display procedure which is efficient and which enables flexability including display of the picture on a device independent of the device's resolution characteristics.

During encoding, attributes of each element of a picture or image (such as its color) are specified by a group of N bits. The bits are assembled to form M-bit active portions of a series of data words (bytes). M and N need not be integer multiples, i.e., evenly divisible by each other. Ones of the words also define the size of the elements with respect to a so-called "unit screen coordinate space" (the horizontal and vertical dimensions—dx and dy, respectively—of each element can be different), the order in which the elements are arranged within the active portion of the unit screen (e.g., left to right or vice versa), the value of N, as well as information specifying the boundary values or dimensions of the active area and the starting point in the active area for the first pel in the sequence being processed.

During the decoding, the attributes of each picture element are extracted from the data word stream and the location of the pel is determined with respect to the unit screen coordinate space. This is done by locating the first pel at the specified starting point and locating succeeding pels in adjacent positions along a series of parallel scan lines, in the order specified. During this part of the decoding procedure, when a pel being processed lies in a position on the unit screen which meets or exceeds the boundaries of the active area, a predetermined incrementing procedure is followed.

After the location of each pel with respect to the unit screen has been determined, the attributes of that pel are mapped to and written in one or more storage locations in a frame memory, and the procedure repeated for the next pel in the sequence. The frame memory includes an array of storage locations which are read sequentially in order to actually display the picture on a display device. During mapping, if a succeeding pel is entered in one or more previously written storage locations in the frame memory, the existing contents of that memory element are overwritten.

BRIEF DESCRIPTION OF THE DRAWING

The present invention will be more clearly appreciated by consideration of the following detailed description when read in light of the accompanying drawing in which.

DETAILED DESCRIPTION

Figure 1:
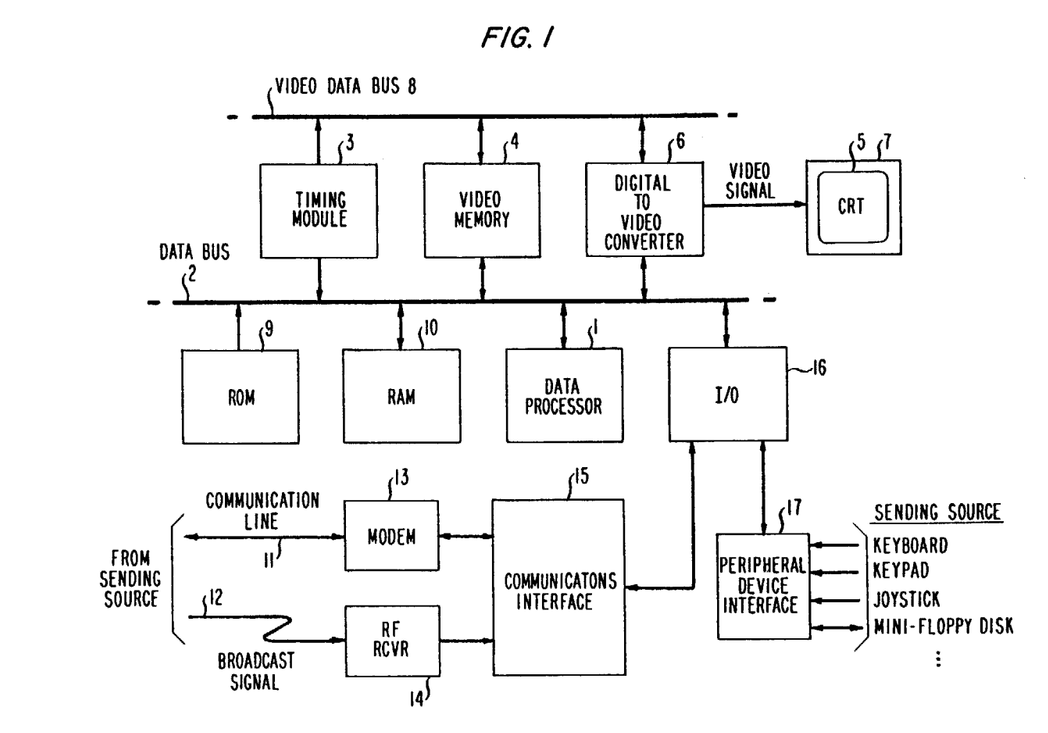
FIG. 1 is an overall block diagram of an image display system which employs the principles of the present invention.

The present invention will be better appreciated when first put in proper perspective with respect to an overall image display system which embodies the present invention. As shown in FIG. 1, such a system includes a data processor 1 having bidirectional access to data bus 2. Timing module 3 provides the clock signals required for system operation. Timing module 3 also provides timing signals on video data bus 8 for use by video memory 4, and by digital to video converter 6.

Data processor 1 may be a microprocessor comprising program memory, read only memory 9 and scratch pad or random access memory 10. Data processor 1 responds to user input from a keyboard, light pen or other data input devices well known in the art. In its application with a viewdata or teletext terminal, data processor 1 may also respond to input provided from a remote or centralized data base such as one located at a television broadcast station or a provider of viewdata services. This input is received via communication line 11 and modem 13 or as a broadcast signal 12 via RF receiver 14 to communication interface 15. Input-output device 16 operates to control data from communications interface 15 or from peripheral device interface 17.

Data bus 2 is a bidirectional conduit through which data processor 1 controls video memory 4, timing generator 3 and video controller 6. Several bus structures may be adapted for use in the present invention. Whichever specific bus structure is chosen, the bus generally comprises address capability, a data path and control lines which may include interrupt, reset, clock (for synchronous use), wait (for asynchronous use), and bus request lines.

Timing module 3 may provide the timing signals on both the data bus 2 and the video data bus 8 and may comprise a chain of programmable logic circuits, digital dividers and counters for providing required timing signal outputs. These may, of course, be incorporated into data processor 1. For operation of video data bus 8, a number of different timing signals are required. Horizontal and vertical drive signals are provided in accordance with horizontal and field rates respectively. A dot clock signal is provided at the dot frequency (picture element or PEL rate) of the system. An odd/even field signal indicates if the odd or even field is to be displayed in an interlaced system. A composite blanking signal indicates if video is being displayed or if vertical or horizontal retrace is occurring. Also, a group clock signal or other signals may be provided. The group clock signal indicates when to access data for a new group of picture element data from memory. For example, picture element data in video memory having a slow access time may be serially provided in groups of 4, 8 or 16 picture elements. On the other hand, a parallel data transmission scheme is possible, potentially increasing the requirements for leads of video data bus 8.

Digital to video converter 6 accepts digital image information from the video data bus 8, pel-by-pel, and converts the digital information, if necessary, to analog form for presentation on video display 7. The video converter may be in modular form and comprises three components: (1) color map memory, (2) digital to analog conversion and sample and hold circuits, if required by video display 7, and (3) a standard composite video encoder (for example, for providing NTSC standard video or red, green, blue RGB outputs) and RF modulator (if necessary, for antenna lead-in access to a television set display 7).

Video display 7 may either be a monitor or a television set or it may be other forms of graphic display known in the art, including a liquid crystal display, an LED display or a plasma panel display.

Pictorial information which is to be displayed on CRT 7 or any other display device within a terminal such as that shown in FIG. 1 is encoded for display by a user who may be remotely located from the terminal. The user is furnished with certain information to guide him in making critical choices in the encoding procedure, but is advantageously allowed a great deal of flexibility. When desired, the encoded information may be transmitted to the terminal of FIG. 1 (via communications line 11 or as a broadcast signal 12), decoded in a manner described hereinafter, and eventually displayed on CRT 7 independent of its resolution characteristics.

Figure 2:
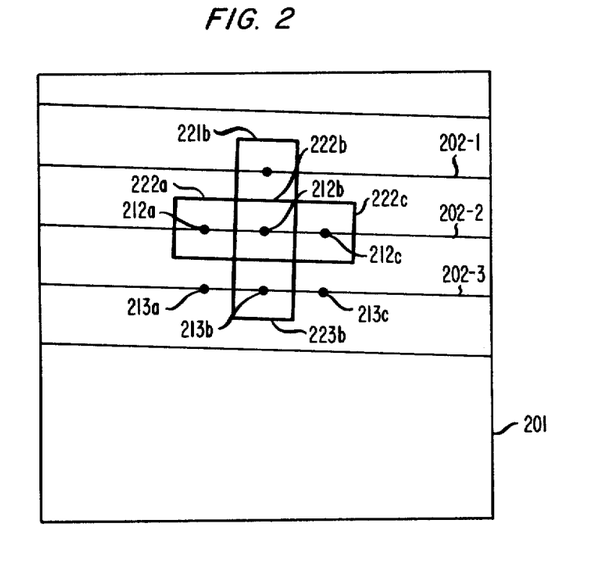
FIG. 2 illustrates the spatial relationships of the picture elements and scan lines in a picture being encoded.
Figure 3:
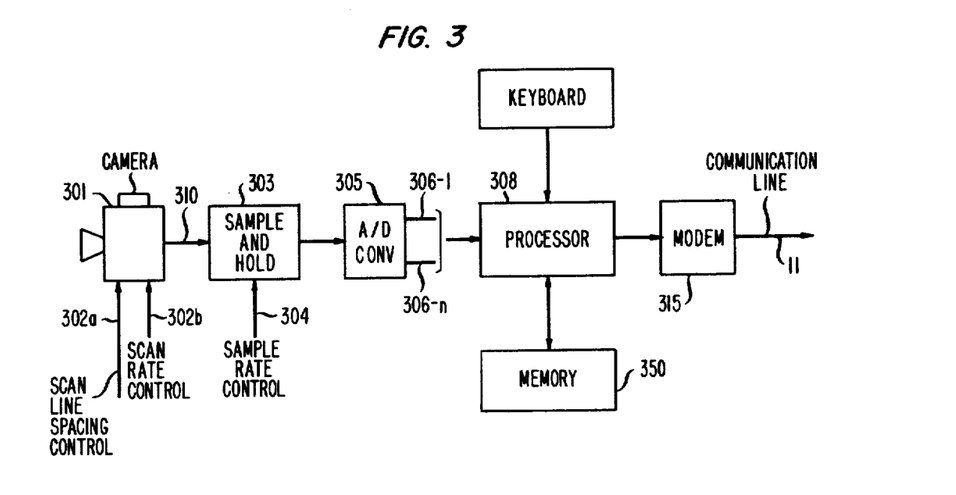
FIG. 3 is a block diagram of one embodiment of pictorial information encoding apparatus arranged to implement the processing technique of the present invention.

An image or picture as shown in FIG. 2 can be encoded, for example, using the system shown in FIG. 3. Camera 301 is arranged to scan picture 201 along a series of generally parallel scan lines, such as lines 202-1, 202-2 and 202-3, at a scan rate determined by a control signal applied to camera 301 on line 302a. The spacing between adjacent lines, shown greatly exaggerated in FIG. 2, is also controllable by the user, via a control signal on line 302b. The output of camera 301 on line 310 is an electrical signal which represents the attributes of picture 201, such as its luminance and chrominance, and it is these attributes which must be encoded, in the correct spatial relation, to enable reconstruction and display of picture 201.

The camera output is sampled by sample and hold circuit 303, at a rate determined by an input on line 304, and each such sample is converted from analog to digital form in an A/D converter 305. Each parallel output from converter 305 on lines 306-1 to 306-n thus represents the attributes of a particular element (pel) of picture 201, and these multibit values are entered in a random access memory 350 via a processor 308. The addresses at which the picture information is stored in memory 350 are provided by the processor, which may be part of a microcomputer or minicomputer such as a Digital Equipment Corp. PDP 11/23. Numerous alternative techniques exist for obtaining information describing elements in a picture, and these can also be used to obtain the values entered in memory 350.

The picture elements which are defined as a result of the scanning and sampling processes are illustrated in FIG. 2. For example, when picture 201 is scanned along line 202-2, sampling may occur at instants marked by points 212a, 212b and 212c. Corresponding vertically displaced sampling points 213a, 213b and 213c are also shown on scan line 202-3. The picture element 222b corresponding to sampling point 212b is a rectangle of width x (measured in the direction of the scan lines) and height y (measured in the direction perpendicular to the scan lines), centered at point 212b. Its vertical edges are located halfway between point 212b and the preceding and succeeding points 212a and 212c, respectively, while its horizontal edges lie halfway between scan line 202-2 and the preceding and following lines 202-1 and 202-3, respectively. Thus, it is seen that pel 222b abuts the preceding and succeeding pels 222a and 222c along common vertical sides, and also abuts pels 221b and 223b on preceding and succeeding scan lines along common horizontal edges. The picture elements thus form a generally rectilinear array which completely cover and define the picture 201 being encoded.

In accordance with the present invention, the system user is enabled to independently define, together with the encoded picture attributes, information indicating the width and height dimensions of the picture elements *relative* to the overall size of a so-called "unit screen", which is described hereafter. This allows a good deal of flexibility when the picture is displayed, as will be illustrated by several examples.

In the "normal" case, when it is desired that the picture 201 fill substantially the entire screen in the display device, the relative width and height values dx and dy, are set at 1/P and 1/L, respectively, where P is the number of samples (of width x) on each of L scan lines (spaced from each other by distance y). This establishes a 1 to 1 correspondence between each element of picture 201 and the elements, called logical pels, in the unit screen, and this insures that when the unit screen is subsequently mapped onto the physical display (such as CRT 7) the entire picture will be reproduced. If it is desired that only the bottom half of the display be used, dx is still set at 1/P (since the full screen width is used) but dy is reduced to ½L, to compress the relative heights of each pel that will be displayed. Information indicating the coordinates of a starting point $X_s, Y_s$ on the unit screen where the picture display is to begin (in this case, at the midpoint) is also encoded, as are coordinates $(X_a, X_b)$ and $(Y_a, Y_b)$ indicating the vertical and horizontal boundaries of a rectangular "active region" within the unit screen, to which display is confined. This active area will be described more fully below.

While the previously described scanning procedure used in camera 301 is conventional, it is sometimes desirable for the user to scan from right to left (instead of from left to right) and/or from bottom to top. Either of these situations is communicated to the terminal of FIG. 1 by treating dx and dy as signed, two's complement numbers, i.e., binary decimals where the most significant bit represents the digit just to the right of the decimal point. When dx is positive, scanning is from left to right, while negative dx indicates the reverse. When dy is positive, scanning proceeds from bottom to top, and a negative dy indicates conventional top down scanning. Thus, as an example, if dx is specified as 0.001010, the leftmost bit indicates a positive number of decimal value ⅛+1/32=0.15625 indicating that scanning is from left to right and that the width of each pel relative to the unit screen is 15.625%. Similarly, if dy is specified as 1.000101, the scanning lines proceed from top to bottom (dy negative) and the pel height is 1/16+1/64=0.078125.

Information specifying the sign and magnitude of dx and dy, the values of other user specified variables such as $X_s, Y_s, X_a, X_b, Y_a$ and $Y_b$, as well as other control information described below, are entered in memory 350. The input may be made on a keyboard 312, and entered via processor 308 in certain preselected locations in memory 350 which are later accessed when the information is read from the memory, assembled, and transmitted to the terminal of FIG. 1. The data read from memory 350 may be conditioned for application to communication line 11 using a conventional modem 315. If no information has been entered in certain memory locations, a default condition is recognized in the processor, whereupon predetermined "common" values may be used to indicate the user specified variables involved.

Figure 4:
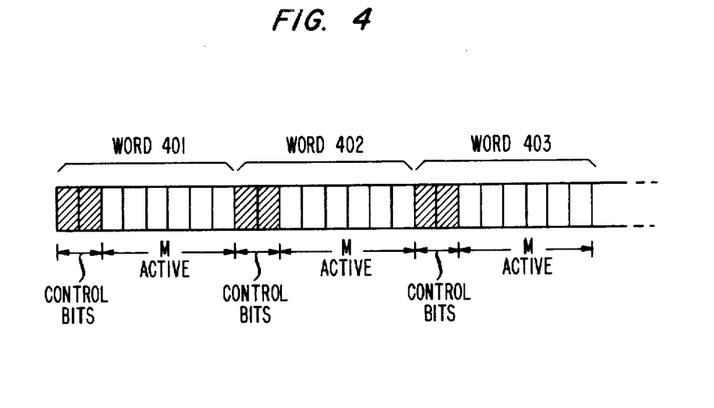
FIG. 4 illustrates a series of bytes used in communication between the apparatus of FIG. 3 and the terminal of FIG. 1.
Figure 5:
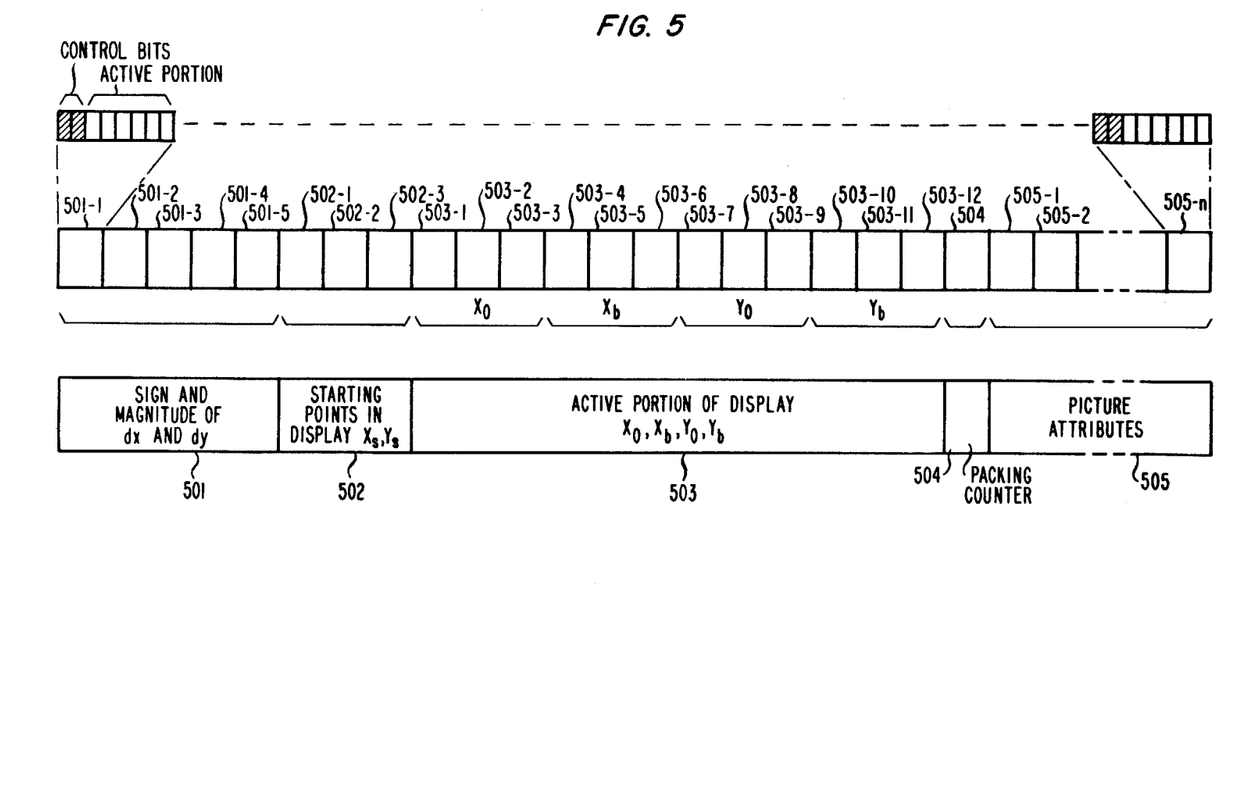
FIG. 5 illustrates an example of the types and sequence of the information coded in the apparatus of FIG. 3 in accordance with the present invention.

One example illustrating the arrangement of data in accordance with the present invention as it is read from memory 350 and applied to communication line 11, is shown in FIGS. 4 and 5. The data consists of a series of multibit words (bytes) of a fixed predetermined length "agreed upon" in advance by the encoder of FIG. 3 and the decoder described hereinafter, at least with respect to each communication session. Typically, a 7 or 8-bit code may be used, and the latter is illustrated in FIG. 4. It is noted that the basic coding scheme described herein is built upon the framework established by CCITT Recommendation S.100, "International Information Exchange for Interactive Videotex," Yellow Book, Volume VII.2, Geneva, 1980. Within each word, such as words 401, 402, 403, M-bits (M is shown as 6) are considered to be active, while the remaining bits (two in FIG. 4) are used for parity, error correction and other control purposes.

The order or sequence in which words in FIG. 4 describe the user specified variables (such as but not limited to dx, dy, $X_a, X_b, Y_a$ and $Y_b$) must also be agreed in advance between the encoder and the terminal. The CRC Technical Note identified above and incorporated herein by reference, describes one protocol or standard which may be followed. However, the present invention is not limited or confined to use with a particular standard, and the illustrative order shown in FIG. 5 is assumed to have been agreed upon by the encoder of FIG. 3 and the decoder portion of the terminal of FIG. 1.

In FIG. 5, the first information conveyed (block 501) describes the sign and magnitude of dx and dy, thus defining the "logical pel" size and the scanning direction used to obtain the picture information. This information may require use of the active M-bit portions of several bytes (such as 8-bit words 501-1 through 501-5). Next, information (block 502) is entered indicating the coordinates $X_s, Y_s$ in the unit screen, of the starting point of the display. Again, several bytes 502-1 through 502-3 may specify this information. The starting coordinates are followed, in turn, by coordinate definitions (block 503) of the active portion of the unit screen that will be used to display the picture attributes which follow. Each of the four values may illustratively require several bytes 503-1, 503-2, et cetera.

The next type of user specified information (block 504) is called a packing counter count N, which is an unsigned integer that describes the number of consecutive bits to be taken from the active portions of successive picture attribute words (block 505) to make up a specification of a single pel. M and N need not be integer multiples of each other, so that a given pel may be described in terms of bits derived from more than one byte. This arrangement is advantageous, in that flexibility is provided in the specification of the picture attribute information and the number of bits transmitted is used efficiently.

Many alternatives exist concerning the description of pel attributes. For example, code words can be used to describe percentage luminance values or color values can be described in terms of the primary colors or in terms of a table look-up scheme in which certain pre-agreed codes are communicated in advance, to both the encoder and display terminal. The codes can represent either a predefined series of colors or alternatively color information in a predefined specification scheme. The latter type of technique is fully described in a concurrently filed application by the same inventors as in the instant application, entitled "Terminal Independent Color Memory For A Digital Image Display System" which is incorporated herein by reference.

An example of the manner in which the active portions of the bytes in block 505 specify a particular attribute—color—of the pels being processed will be helpful. As mentioned previously, the color specifications for the pels in picture 210 are represented sequentially in the active portions of the bytes (such as bytes 505-1, 505-2), without regard to byte boundaries. In one arrangement, the bits are used, N at a time, to define the color; for this purpose, the bits are organized into three tuples representing the three primary colors, and the order of interpretation of the bits is green-red-blue. The color specification for a single pel may contain multiple three-tuples, depending on the packing count N. For $N > 3$, the first three-tuple contains the MSBs, and the last contains the LSBs of the three primaries. For example, if the packing count is $N = 6$, the color specification for each pel would look like GRBGRB, and each primary color would be specified to two bits of accuracy. In some instances, it is desirable that the packing count N is not an integer multiple of three, so that each primary is not specified to an equal accuracy. For example, if the packing count $N = 4$, the color specification for each pel would look like GRBG. The bits in the active portion of the bytes would look like GRBGGRBG . . .

The word string of FIG. 5 is assembled in the correct sequence under control of processor 308, which includes instructions for sequentially reading from memory 350 the contents of the preselected registers which contain the appropriate user specified variables, followed by the registers which contain the pel attribute (color) information. The instruction set is straightforward, and many alternatives will be apparent to those skilled in the art.

Figure 6:
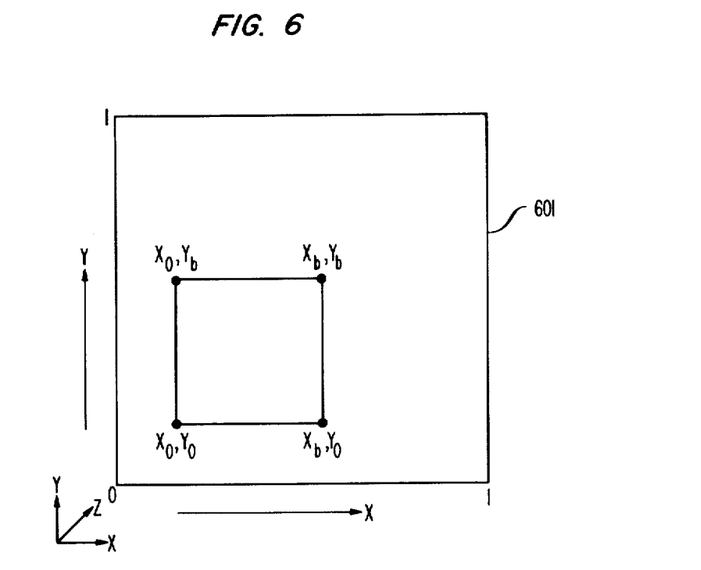
FIG. 6 graphically illustrates the coordinate space established by the unit screen and active drawing area used to define encoded pictorial information.

Display of the pictorial information encoded using the procedure just described will be appreciated by first considering the "unit screen", mentioned earlier and illustrated in FIG. 6, which is defined as the virtual address space 601 within which the picture is to be displayed, having dimensions 0 to 1 in both the horizontal (x) and vertical (y) directions. The active portion of the unit screen, defined by the user selected variables $X_o$, $X_b$, $Y_o$ and $Y_b$, is a rectangular portion 602 of the screen, as, for example, the rectangle having vertices at coordinates $(X_o,Y_o)$, $(X_b,Y_o)$ $(X_b,Y_b)$ and $(X_o,Y_b)$ as shown in FIG. 6. It is convenient to define $X_o$ and $Y_o$ as the boundaries *away* from which scanning occurs: for dx positive, $X_o$ is to the left of $X_b$, but for negative dx, the positions are opposite. Similarly, for positive dy, $Y_o$ is the bottom of the active area and $Y_b$ the top, with the opposite for negative dy. In the example shown in FIG. 6, scanning is from left to right and bottom to top. The values of all four variables lie between zero and one (i.e., $0 \leq x < 1$ and $0 \leq y < 1$). In the most normal case, when it is desired that the encoded picture fill substantially the entire screen available on the display device, the active area will be co-extensive with the unit screen, when the display device is square. When the physical display has the conventional 4:3 rectangular aspect ratio and scanning is from left to right and top to bottom, active area settings of $X_o=0$, $X_b=0.999$ . . . , $Y_o=0.75$ and $Y_b=0.0$ would fill the entire screen. This is because the mapping procedure *from* the unit screen *to* the physical display, which will be described more fully below, is arranged so that the origin (0,0) of the unit screen is mapped to the lower left corner of the physical display, and the lower right (1,0) of the unit screen is mapped to the lower right corner of the display. With this mapping fixed, the upper left corner (1,0) of the unit screen would be mapped outside of the physcial display area; by limiting the active area the y coordinate of approximately 0.75 on the unit screen would correspond to the top of the display, and all information would be displayed.

Several further examples will illustrate the relationship between the unit screen, the active area, and the logical pel size, all of which are user defined. In these examples, it is assumed that dx is positive and dy negative, and that the physical display is square, so that the active display area limitation mentioned above for a rectangular display device is not needed. For display of the entire picture on the entire bottom half of the screen, the user would set $X_o=0$, $X_b=0.999$ . . . , $Y_o=0.5$ and $Y_b=0.0$. If the height dy of the logical pel is 1/L, where L is the number of scan lines in the original picture and is not divided by a factor of 2, then only the top *half* of the picture would be displayed in the bottom half of the display, but it will be compressed in a 2:1 ratio in the vertical direction. As will be described below, scrolling (line by line movement of the display picture in the vertical direction) can be used to display the second half of the picture. As an alternative, if $dy = \frac{1}{2}L$, the entire picture would appear in the bottom half of the display. As a second example, if it is desired to display the picture in the upper left quadrant of the diaplay, then the entire area is defined as $X_o=0$, $X_b=0.5$, $Y_o=0.999$ . . . and $Y_b=0.5$. To properly scale the picture, both dimensions of the logical pel should also be reduced by a factor of 2, i.e. $dy = \frac{1}{2}L$ and $dx = \frac{1}{2}P$, where L and P are the number of lines per frame and pels per line in the original picture, respectively.

It is also to be noted that $X_s$ and $Y_s$, the X and Y coordinates of the starting point of the display with respect to the unit screen may be independently specified by the user. In the first example given above, $X_s=0$ and $Y_s=0.5$ would be appropriate. In the second example (active area in the upper left quadrant), $X_s=0$ and $Y_s=0.999$ . . . would be used.

The ability of the user in accordance with the invention, to specify the active area dimensions (which need not be quadrants but can be any fractions of the unit screen) independently of the logical pel size, gives much flexibility in achieving certain types of special effects. However, appropriate coordination between these values is normally required.

When encoded pictorial information is received at the terminal of FIG. 1 via communication line 11, it is appropriately demodulated in modem 13 and applied to communications interface 15. In instances where radio transmission is used, the broadcast signal is demodulated in receiver 14 before being input to interface 15.

Functions performed in the interface include demultiplexing, error correction, retiming and so on, and are well known to those skilled in the art. The output of interface 15 is coupled through input/output circuit 16 and the information shown in FIG. 5 is applied to various registers in random access memory 10, under control of data processor 1. For this purpose, the terminal includes appropriate program information stored in ROM 9 to recognize the order in which the information is presented, and to correctly interpret control signals encoded together with the pictorial data. A description of the general characteristics of a videotex system is contained in a simultaneously filed application entitled "Terminal Generation of Definable Character Sets" filed by the same inventors as in the present application.

As the user specified inputs and the picture attributes are entered in RAM 10, they may be concurrently processed for display, or they may be stored for later use. In either event, the decoding procedure of the present invention includes the following steps. First, the location of each picture element with respect to the unit screen is determined. Second, each pel location on the unit screen is mapped to one or more corresponding locations in a video memory 4, and the attributes describing the pel written in the location(s). Next, the contents of memory 4 are read sequentially. Depending on the type of display device used, the memory output may be converted to conventional video format in converter 6. Finally, the video signal is applied to display device 7.

Figure 7:
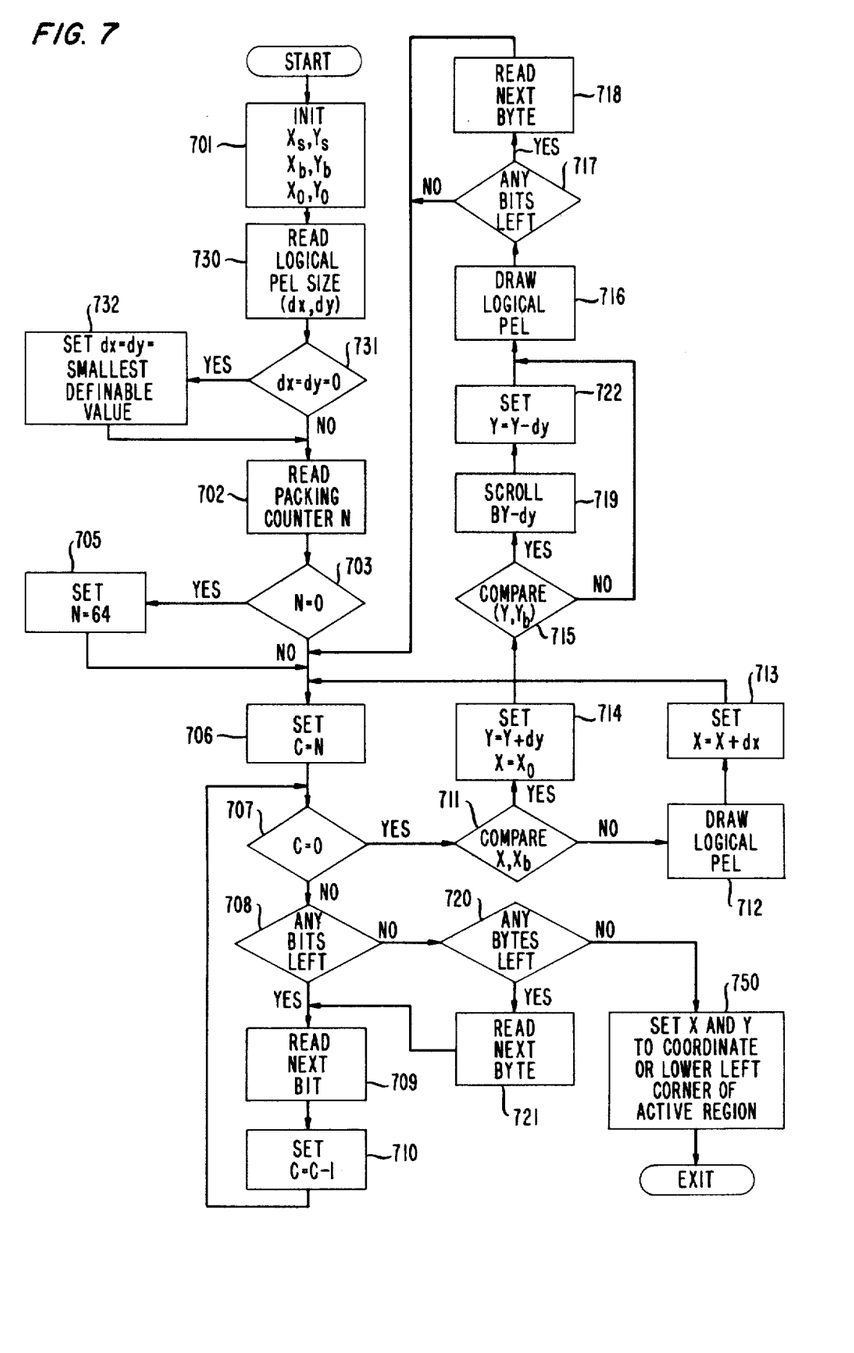
FIG. 7 is a flowchart illustrating the steps in a procedure in accordance with the present invention for drawing or locating the information representing the encoded picture with respect to the unit screen.

The flowchart of FIG. 7 illustrates the steps followed in accordance with the present invention in order to locate each received pel with respect to the coordinate of the unit screen. This procedure in effect determines *where* on the *unit screen* each logical pel belongs: each location is expressed as coodinates x, y referenced to the unit screen.

In the first step 701, the user specified values $X_o$, $X_b$, $Y_o$ and $Y_b$ which define the active area on the unit screen are initialized as are $X_s$ and $Y_s$, the starting x and y coordinates. This information is obtained from the input information, blocks 502 and 503, and stored in specified locations in RAM 10. The next step, 730, reads the logical pel size dx and dy from the incoming data, and stores these values in RAM 10. If both dx and dy are zero (step 731), a default condition is recognized, whereupon dx and dy are set (step 732) to the smallest positive definable value permitted by the number of bits which define those variables. For example, if dx includes a sign bit and 7 two's complement magnitude bits, then the smallest definable value is 1/128. If either dx or dy is non-zero, then in step 702, the packing count N is read (as obtained from block 504) and stored in memory. A branch step 703 next determines if a default condition exists: if N=0, a default packing count, for example, N=64, is set in step 704, while otherwise, the processing proceeds to step 706.

In the remaining portion of the process shown in FIG. 7, the series of input bytes containing information describing the picture attributes (block 505 in FIG. 5) are processed to re-assemble the active bits, N at a time, with each group of N bits representing the attributes of a single logical pel at coordinates x, y on the unit screen.

In step 706, a process variable C is set equal to N, the number of bits which define the attributes of each pel. Thereafter, in steps 707-710, the bits in the active portions of picture attribute words (block 505 in FIG. 5) are assembled, N at a time. Specifically, step 707 is a branch point depending upon whether C=0. If not, and bits in the last byte extracted from the incoming datastream still remain to the processed (step 708), the next bit is read from the register which contained the byte. The bits that have been read are assembled in an in-process register, and C is then decremented to C=C−1 (step 710). If no bits are left in the byte being processed, but it is determined in step 720 that other bytes are available, the next one is read (step 721) and the process continues at step 709.

When C=0 occurs, N bits have been assembled in the in-process register. Step 711 compares the present X coordinate to $X_b$, to determine if the X-direction boundary of the active drawing area has been met or exceeded. If not, the logical pel is drawn or mapped into memory 4 (step 712) in a manner described hereinafter, at the currently specified x and y coordinates. The value of x is then incremented by the value dx (which may be positive or negative) of the logical pel (step 713) and the process repeated from step 706. If dx is positive, the next pel lies to the right of the previous pel, but if dx is negative, the next pel lies to the left.

When the value of X equals or exceeds the value of $X_b$, the active area boundary has been met. Step 711 produces a positive branch which, in step 714 sets Y to Y + dy (dy may be positive or negative) thus incrementing the scan line position and X is set to $X_o$, thus restarting the X position on the new line. If dy is positive, the next line is above the previous line, but when dy is negative, it is below the previous line. After being incremented, the new value Y is compared to $Y_b$ (step 715) to insure that the horizontal boundary (top or bottom) of the active area has not been met or exceeded. If not, the pel is drawn (step 716) in the same manner as in step 712, to be explained below. However, by convention, if any bits are left in the byte presently being processed, they are discarded (step 717) and the next byte read (step 718) before returning to step 706.

When the branch at step 715 indicates that the top or bottom of the active area has been met or exceeded, the entire display lying within the area of the screen defined by the active display area is scrolled by −dy in step 719. This is done by sending a control signal to memory 4 to perform a mass shift of the appropriate portion of its contents in a vertical direction. Thus, if writing is proceeding down the screen, scrolling is up, and viceversa. Thereafter, in step 722, the value of Y is reduced by dy, to in effect cancel the last Y direction increment in step 714, and the pel is drawn in step 716.

When all bytes have been read, the picture has been fully processed, and the variables X and Y are reset in step 750 prior to exiting from the process of FIG. 7. The X and Y values used for resetting are the coordinates of the lower left corner of the active drawing region. This allows subsequent drawing operations to commence from a precisely specified point.

When steps 712 and 716 in FIG. 7 are performed, the N-bit attribute value (color, etc.) for the present pel, just extracted from the byte sequence being processed, is written or mapped into one or more storage locations in video memory 4 of FIG. 1. This mapping procedure will be explained by reference to FIGS. 8-10, the first two of which graphically illustrate mapping with different logical pel sizes, and the latter of which is a flowchart of the steps used in mapping.

Video memory 4 is usually a frame memory (RAM) having a rectilinear array of storage locations or registers each capable of storing the attributes of one display element (display pel) that can be presented on display device 7. It is anticipated that memory 4 will be made as large as possible, given constraints of economy and the inherent resolution capability of the display 7, so that a reasonable visual resolution may be obtained. As an example, if display 7 is a CRT, a frame memory for storing any array of 256 by 256 display pels would be common. Alternatively, if display 7 is a bi-level device such as a plasma panel, the on-off attribute of each pel is represented by only one bit, and a greater resolution (say, 512 by 512 pels) can be expected.

Figure 8:
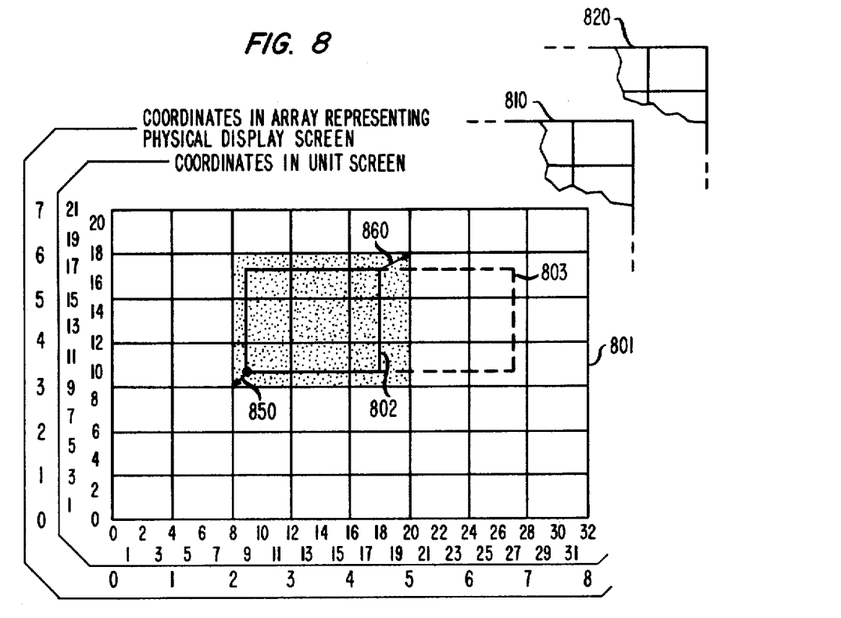
FIGS. 8 and 9 illustrate the mapping of logical pels of different sizes onto an array representing the physical display screen.
Figure 9:
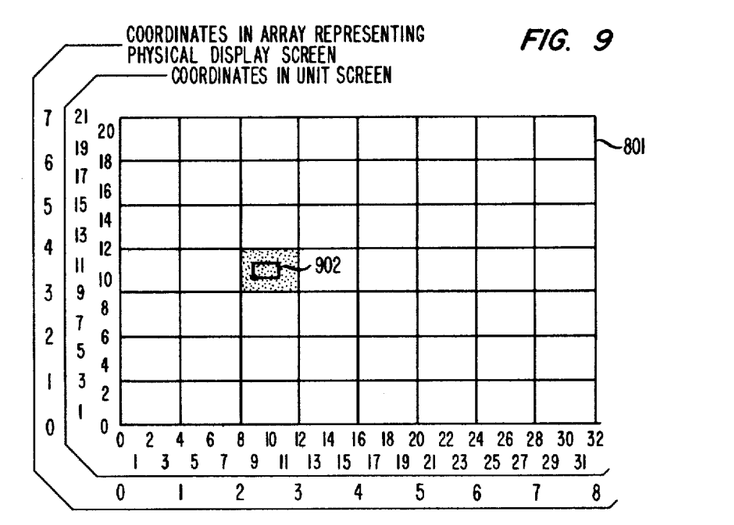

A portion of the array (801) of storage locations in video memory 4 is represented in FIGS. 8 and 9 as a plurality of individual rectangles positioned in a series of rows and a series of columns. Where the picture attributes are represented by multiple bits (N>1), memory 4 may include several memory planes, one for each bit. The other memory planes are illustrated in FIG. 8 by showing small portions of two other arrays 810 and 820.

When it is desired to enter the attributes of a logical pel (such as pel 802 in FIG. 8) into the appropriate storage location in memory 4, the logical pel is mapped or superimposed on the array of FIGS. 8 or 9. Three sets of variables control the mapping process: (1) the current X, Y position of the pel; (2) its size, specified by dx and dy; and (3) the size of the memory array. In determining position, the geometric alignment of the X, Y position within the logical pel is predefined by convention. For example, the location used is (a) lower left corner if dx and dy are both positive, (b) lower right corner if dx is negative and dy is positive, (c) upper left corner if dx is positive and dy is negative, and (d) upper right corner if dx and dy are both negative. Thus, in FIGS. 8 and 9, assuming that dx and dy are both positive, a relatively large pel 802 in FIG. 8 and a relatively small pel 902 in FIG. 2 have commonly located lower left hand corners at coordinates X=9/32, Y=10/21.

In order to determine the coordinates $X_a$, $Y_a$ of the lower left hand corner of a storage location in array 801 which corresponds to a pel in the unit screen at coordinates X, Y, a linear mapping is performed from the unit screen to the array, such that $$X_a = W \cdot X \text{ and} \quad (1)$$

$$Y_a = H \cdot Y \quad (2)$$

where H is the total number of storage locations in each column of the array and W is the total number of storage locations in each row of the array. In FIGS. 8 and 9, W=8 and H=7. Thus, for this example, $$X_a = 8(9/32) = 2.25 \text{ and}$$

$$Y_a = 7(10/21) = 3.33.$$

A similar mapping is next performed to locate the coordinates $X_{a1}$, $Y_{a1}$ of the diagonally opposite corner of the logical pel with respect to the array. This is done by realizing that the coordinates of this far corner in the unit screen are x+dx and y+dy. In the example shown in FIG. 8, dx=9/32 and dy=7/21. Thus, using Equations (1) and (2):

$$X_{a1} = W(x+dx) = 8(9/32+9/32) = 4.5 \text{ and}$$

$$Y_{a1} = H(y+dy) = 7(10/21+7/21) = 5.66.$$

After the coordinates of the diagonally opposite corners of the logical pel have been mapped to the memory array, the storage locations into which the attribute value for that pel are to be entered can be determined, using several different strategies.

In accordance with one strategy, if *any portion* of a storage location in the array is "covered" or included in the mapping, the pel attributes are written into that location. This strategy assures that each "logical pel" will always map to at least one (but possibly many) display pels. Other strategies could depend on the percentage of coverage. Using "any portion" strategy in FIG. 8, the attributes for pel 802 are entered in the 9 storage locations in columns 3, 4 and 5 at rows 4, 5 and 6. These are shown shaded in FIG. 8. The attributes for pel 902 of FIG. 9, when similarly processed, are loaded in one memory location in column 3, line 3. If the next pel being processed (as pel 803 in FIG. 8) "covers" any previously written storage locations (such as those in column 5, rows 4, 5 and 6) the information stored at that location is overwritten. If either the width or the height of the logical pel is specified as zero, only a line will be drawn. If both the width and height of the "logical pel" are specified as 0, the "logical pel" reduces to a dimensionless drawing point. This invokes the default condition explained in connection with FIG. 7.

Figure 10:
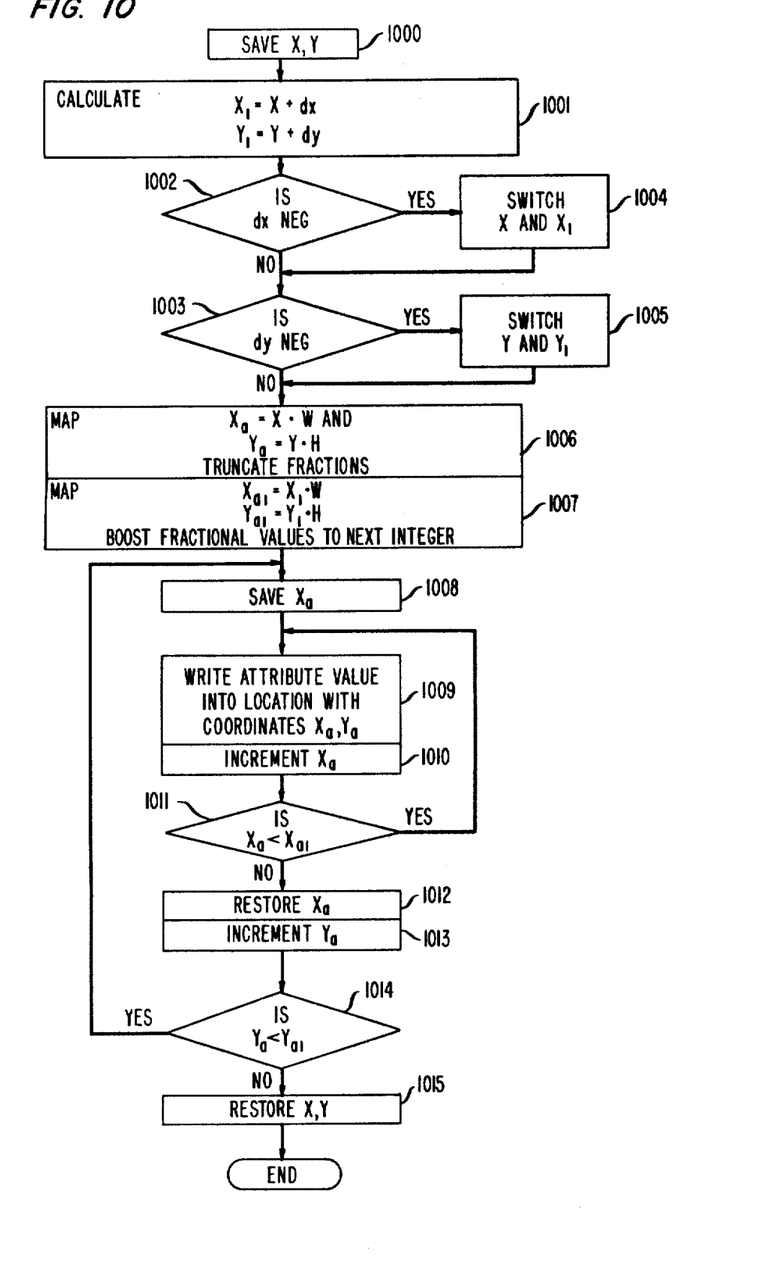
FIG. 10 is a flowchart illustrating the steps in a procedure for mapping as illustrated in FIGS. 8 and 9.

The mapping procedure just described can also be explained by reference to the flowchart of FIG. 10. To repeat, during each mapping operation, it is desired to identify the coordinates of one or more storage locations in video memory 4 that correspond to the logical pel being processed. This is done as a function of the coordinates X, Y of the logical pel, with respect to the unit screen, its size dx, dy, also with respect to the unit screen, and the total number W and H of storage locations (one for each display pel in device 7) in each row and column of the memory array, respectively.

In the first step (1000) the current values of x and y are saved in registers so that they may be correctly restored at the end of the routine. In the next step 1001, the coordinates $X_1$, $Y_1$ with respect to the unit screen of the corner of the logical pel diagonally opposite to the corner at location X, Y are calculated, using $$X_1 = X + dx \text{ and} \quad (3)$$

$$Y_1 = Y + dy. \quad (4)$$

In the next steps 1002 and 1003, a determination is made as to whether dx or dy are negative. If dx is negative, X and $X_1$ are switched (step 1004) and, if dy is negative, Y and $Y_1$ are switched (step 1005). This is done so that the truncation and boosting in steps 1006 and 1007 are always in the correct sense. Next, in steps 1006 and 1007, the coordinates of both corners are mapped to the storage location array, defining coordinates $X_a$, $Y_a$ and $X_{a1}$ and $Y_{a1}$, respectively. The coordinates $X_a$, $Y_a$ are determined from Equations (1) and (2) above. In these multiplications, any fractions are truncated, so that $X_a$, $Y_a$ maps "down and to the left" as shown by arrow 850 in FIG. 8. When $X_{a1}$ and $Y_{a1}$ are mapped in step 1003, the equations used correspond to Equations (1) and (2), namely:

$$X_{a1} = W \cdot X_1 \quad (5)$$

$$Y_{a1} = H \cdot Y_1. \quad (6)$$

However, if any fractions result from these multiplications, the result is boosted to the next higher integer. This has the effect of mapping the diagonally opposite corner "up and to the right" as shown by arrow 860 in FIG. 8. After truncation and boosting in the example of FIG. 8, $X_a=2$; $Y_o=3$; $X_{a1}=5$ and $Y_{a1}=6$.

With the mapping of the diagonal corners thus complete, all that remains in the procedure is to identify the storage locations in the memory array into which the attributes are to be written. First, the value of $X_a$ is saved in a register (step 1008) and the attribute value being processed is then written (step 1009) in the storage location at $X_a$, $Y_a$. In the example of FIG. 8, this would be the location in row 4, column 3, since by convention coordinates (2, 3) specify the lower left corner of this location.

The value of $X_a$ is next incremented (step 1010) by one, and a test performed (step 1011) to see if the current value of $X_a$ is less than the value $X_{a1}$. If it is, the write process step 1009 is repeated for the incremented value. This corresponds to the storage location in row 4, column 4 in FIG. 8.

When $X_a$ is not less than $X_{a1}$, the value of $X_a$ previously saved in step 1008 is restored (step 1012) and $Y_a$ is then incremented by one in step 1013. A test is then made (step 1014) to insure that the new $Y_a$ is less than $Y_{a1}$. If so, the procedure returns to step 1008, and the process repeats for the storage locations in the next row (row 5 in FIG. 8). When $Y_a$ is not less than $Y_{a1}$, the original values of x and y are restored (step 1015) and the mapping procedure for the current logical pel has been completed. The entire process of FIG. 10 is then repeated in order to enter the attributes of the corresponding locations in the memory array. As mentioned before, overwriting of some information may occur.

It may be desirable, depending on the relationship between the "logical pel" dimensions and the physical pel dimensions on an individual display device, to perform a pre-execution rescaling of both the "logical pel" dimensions and the active drawing area dimensions to avoid certain types of distortions that will result from a mismatch. The goal of this type of rescaling would be to make the "logical pel" dimensions become either integer multiples or integer fractions of the corresponding physical pel dimensions. (The active drawing area dimensions would have to be scaled equivalently in order to maintain line synchronism in the image.) This type of rescaling is terminal dependent, but is permissible as long as the "logical pel" dimensions and active drawing area dimensions are restored to their prescaled values after the picture has been processed and displayed. In the rescaling, care must be taken to insure that the resultant image lies within the original active drawing area.

The technique for processing pictorial information for display described above is primarily intended for use in conjunction with a videotex or other computer-based information system which can operate in a variety of modes and which can accommodate a variety of information types other than pictures. This information can include text, line drawings, mosiacs, special purpose characters and the like. For this reason, the terminal of FIG. 1 will include operating and support programs usually stored in ROM 9, for performing various functions such as mode control (i.e., text, line drawing modes, et cetera) input/outut control, and so on. The control bit portions of each word shown in FIG. 4 contain information recognized and used in controlling overall system operation, such as switching between modes, activating input/output sequences, and so on. By virtue of the flexibility built into the terminal of FIG. 1, it is possible for the picture entered in memory 4 to be further processed prior to display. A remapping of the stored pel attributes can change the colors of the display, the texture of the picture, or its relative dimensions, to give just a few examples.

Various modifications and adaptations of the present invention will be readily recognized by those skilled in the art. For this reason, it is intended that the invention be limited only by the appended claims. For example, while a video camera is shown as the input device in FIG. 3, picture information can come from a facsimile terminal, a video tape scanner, or other device capable of representing a picture as a raster scanned sequence of attributes including but not limited to black/white values, gray levels, luminance/chrominance values, et cetera. Similary, it is to be clearly understood that many different display devices can easily be substituted for the CRT of FIG. 1.

What is claimed is:

1. A method for displaying a picture on a display device comprising the steps of:
   defining said picture in terms of a unit screen coordinate space comprising a plurality of generally rectangular logical picture elements (pels) having a predefined width dx and a predefined height dy, each of said pels having an associated N-bit code word indicating its visual attributes;
   mapping the location of a first one of said logical pels from said unit screen coordinate space to a corresponding location in a display memory which includes an array of discrete storage locations arranged in a plurality of rows and columns;
   writing the N-bit code word associated with said first logical pel in storage locations identified in said mapping step;
   repeating said mapping and writing steps for each of said logical pels defining said picture; and
   sequentially applying the contents of said display memory to a display device,
   wherein said defining step includes:
   generating a series of samples each representing the attributes of a particular element of said picture, said elements lying along a plurality of generally parallel raster scan lines;
   converting each of said samples to an N-bit digital word;
   sequentially assembling each of said words in the M-bit active portions of a stream of bytes, where M and N need not be interger multiples;
   encoding an indication of the value of N; and
   encoding the values of said predefined width dx and said prefined height dy as signed numbers which indicate: (1) the direction in which said picture is scanned, and (2) the values of said width dx and height dy as a fraction of said unit screen coordinate space, such that said picture is entirely displayed as long as $dx=1/P$ and $dy=1/L$, where P is the number of said samples on each of said scan lines and L is the number of lines scanned.

2. The method of claim 1 wherein said defining step further includes specifying horizontal and vertical boundaries of an active area within said unit screen, said active area defining a portion of said display memory within which said picture will be mapped, and said mapping step includes:

(1) locating said first one of said logical pels at a predetermined starting location in said active area, (2) locating the next one of said logical pels at a location spaced dx from said starting location, (3) repeating said last mentioned locating step (2) until one of said vertical boundaries of said active region is met or exceeded, (4) locating the next one of said logical pels at a position adjoining the other one of said vertical boundaries but spaced dy from the line defined by the last processed pels, and (5) repeating step (2).

3. The method of claim 2 wherein said mapping step further includes scrolling the pels in said active area when one of said horizontal boundaries is met or exceeded in said last-mentioned locating step (4), wherein scrolling includes shifting all priorly determined locations in the portion of said display memory defined by said active area by an amount $(-dy)$.

4. A method for displaying a picture on a display device comprising the steps of:

defining said picture in terms of a unit screen coordinate space comprising a plurality of generally rectangular logical picture elements (pels) having a predefined width dx and a predefined height dy, each of said pels having an associated N-bit code word indicating its visual attributes;

mapping the location of a first one of said logical pels from said unit screen coordinate space to a corresponding location in a display memory which includes an array of discrete storage locations arranged in a plurality of rows and columns;

writing the N-bit code word associated with said first logical pel in storage locations identified in said mapping step;

repeating said mapping and writing steps for each of said logical pels defining said picture; and sequentially applying the contents of said display memory to a display device, wherein said mapping step includes:

(a) determining the coordinates $(X, Y)$ and $(X_1, Y_1)$ of diagonally opposite corners of said pel with respect to said unit screen coordinate space, where $X_1 = X + dx$ and $Y_1 = Y + dy$, (b) forming for each set of coordinates a corresponding set of coordinates $(X_a, Y_a)$ and $(X_{a1}, Y_{a1})$ in said display memory array, where $$X_a = W \cdot X \quad (1)$$

$$Y_a = H \cdot Y \quad (2)$$

$$X_{a1} = W \cdot X_1 \text{ and} \quad (3)$$

$$Y_{a1} = H \cdot Y_1 \quad (4)$$

and where W is the number of storage locations in each of said rows and H is the number of storage location in each of said columns.

5. The method of claim 4 wherein said forming step includes:

(a) truncating the fractional portion of the products formed using Equations (1) and (2); and (b) boosting to the next highest integer any fractional portion of the products formed using Equations (3) and (4); and said writing step includes identifying said storage locations using the coordinates formed in said boosting and truncating steps.

6. A method of displaying an encoded representation of a picture on a display device independent of the device's resolution characteristics, said picture including a plurality of elements lying along a series of generally parallel scan lines, comprising the steps of:

(1) forming said representation by encoding (a) the attributes of a plurality of said elements of said picture, (b) the boundaries of the active area of a unit screen coordinate space which defines a portion of a display memory into which said elements of said picture are to be mapped, and (c) the location of the first of said elements of said picture in said active area;

(2) locating the coordinates of each of said elements of said picture with respect to said unit screen coordinate space;

(3) mapping the coordinates of each element of sad picture formed in the last mentioned step to a rectilinear array representing storage locations in said display memory;

(4) writing said attributes of each element of said picture into at least one of the storage locations mapped in said last mentioned step; and (5) sequentially reading said attributes stored in said memory to form a signal for application to said display, wherein said locating step includes:

(A) locating the next of said picture elements adjacent to said first picture element at a specified displacement dx along the same scan line;

(B) repeating the last mentioned locating step for successive picture elements until one of said boundaries of said active region is met or exceeded, (C) locating the next of said picture elements at the opposite one of said boundaries on a scan line displaced from said same scan line by a specified displacement dy, and (D) repeating steps (B) and (C) above until a different one of said boundaries is met or exceeded.

7. The method defined in claim 6 wherein said forming step includes encoding the sign and magnitude of said displacements dx and dy.

8. The method defined in claim 6 wherein said locating step further includes:

(E) shifting the locations of all previously processed picture elements in the portion of said display memory defined by said active area by an amount $(-dy)$ when said different one of said boundaries is met or exceeded.

9. A method of displaying an encoded representation of a picture on a display device independent of the device's resolution characteristics, said picture including a plurality of elements lying along a series of generally parallel scan lines, comprising the steps of:

(1) forming said representation by encoding (a) the attributes of a plurality of said elements of said picture, (b) the boundaries of the active area of a unit screen coordinate space which defines a portion of a display memory into which said elements of said picture are to be mapped, and (c) the location of the first of said elements of said picture in said active area;

(2) locating the coordinates of each of said elements of said picture with respect to said unit screen coordinate space;

(3) mapping the coordinates of each element of said picture formed in the last mentioned step to a rectilinear array representing storage locations in said display memory;

(4) writing said attributes of each element of said picture into at least one of the storage locations mapped in said last mentioned step; and (5) sequentially reading said attributes stored in said memory to form a signal for application to said display, wherein said mapping step includes:

(A) calculating the coordinates (X, Y) of one corner of each pel using the coordinates $(X_1, Y_1)$ of the diagonally opposite corner, where $X_1 = X + dx$ and $Y_1 = Y + dy$, and where dx and dy are the width and height, respectively, of each of said picture elements expressed as a fraction of said unit screen coordinate space, (B) multiplying each of said X, $X_1$ coordinates by the number W of storage locations in each row of said array, and (C) multiplying each of said Y, $Y_1$ coordinates by the number H of storage locations in each column of said array.

10. The method of claim 9 wherein said mapping step further includes:

(D) truncating any fractional portion of the products X·W and Y·H to obtain first coordinates $(X_a, Y_a)$ in said array;

(E) boosting to the next higher integer any fractional portion of the products $X_1$·W and $Y_1$·H to obtain second coordinates $(X_{a1}, Y_{a1})$ in said array; and (F) selecting as said corresponding location all locations in said array within the rectangle having diagonal corners defined by said first and second coordinates $(X_a, Y_a)$ and $(X_{a1}, Y_{a1})$.

11. A system for displaying a picture on a display device comprising:

means for defining said picture in terms of a unit screen coordinate space comprising a plurality of generally rectangular logical picture elements (pels) having a predefined width dx and a predefined height dy, each of said pels having an associated N-bit code word indicating its visual attributes;

means for mapping the location of each of said logical pels from said unit screen coordinate space to a corresponding location in a display memory which includes an array of discrete storage locations arranged in a plurality of rows and columns;

means for writing the N-bit code word associated with each of said logical pels in storage locations identified by said mapping means; and means for sequentially applying the contents of said display memory to a display device, wherein said defining means includes:

means for generating a series of samples each representing the attributes of a particular element of said picture, said elements lying along a plurality of generally parallel raster scan lines;

means for converting each of said samples to an N-bit digital word; and means for sequentially assembling each of said words in the M-bit active portions of a stream of bytes, where M and N need not be integer multiples.

12. The system of claim 11 wherein said defining means further includes:

means for encoding an indication of the value of N; and means for encoding the values of said predefined width dx and said predefined height dy as sign numbers which indicate: (1) the direction in which said picture is scanned, and (2) the values of said width dx and height dy as a fraction of a unit screen, such that said picture is entirely displayed as long as $dx = 1/P$ and $dy = 1/L$, where P is the number of said samples on each of said scan lines and L is the number of lines scanned.

13. Apparatus for encoding a picture for display on a display device, comprising:

means for defining the attributes of each of a plurality of elements of said picture by an associated N-bit code word, said elements lying along a series of generally parallel scan lines which traverse said picture;

means for sequentially assembling said N-bit code words in predefined portions of M-bit bytes, where M and N need not be integer multiples of each other; and means for encoding said bytes together with an indication of (1) the value of N, (2) the size of said elements, (3) the order in which ones of said elements on each of said lines are arranged, and (4) the direction in which said scan lines traverse said picture.

14. A system for displaying an encoded representation of a picture on a display device independent of the device's resolution characteristics, comprising:

(1) means for forming said representation by encoding (a) the attributes of a plurality of elements of said picture, said elements lying along a series of generally parallel scan lines, (b) the boundaries of the active area of a unit screen coordinate space which defines a portion of a display memory into which said pels are to be mapped, and (c) the location of the first of said picture elements in said active area;

(2) means for locating the coordinates of each of said pels with respect to said unit screen coordinate space;

(3) means for mapping the coordinates of each pel formed by the last mentioned means to a rectilinear array representing storage locations in said display memory;

(4) means for writing said attributes of each pel into at least one of the storage locations mapped in said last mentioned means; and (5) means for sequentially reading said attributes stored in said memory to form a signal for application to said display, wherein said location means is arranged to:

(A) locate the next of said picture elements adjacent to said first picture element at a specified displacement dx along the same scan line;

(B) repeat the last mentioned locating step for successive picture elements until one of said boundaries of said active region is met or exceeded, (C) locate the next of said picture elements at the opposite one of said boundaries on a scan line displaced from said same scan line by a specified displacement dy, and (D) repeat steps (B) and (C) above until a different one of said boundaries is met or exceeded.

* * * * *